No. 851,499.
PATENTED APR. 23, 1907.
G. A. CULVER.
HAY RAKE AND LOADER.
APPLICATION FILED JAN. 9, 1904.
2 SHEETS—SHEET 1.
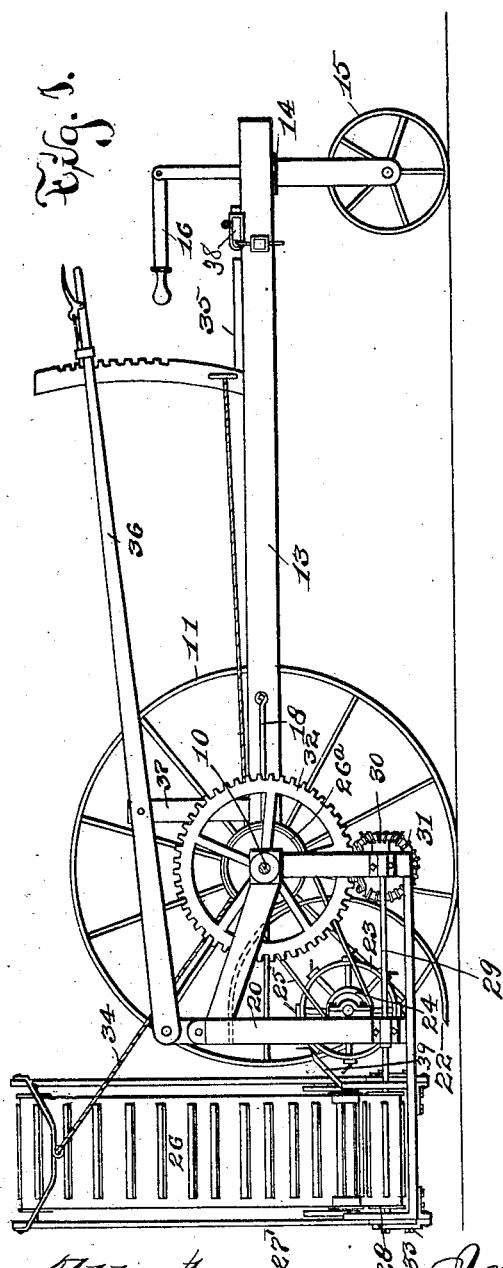
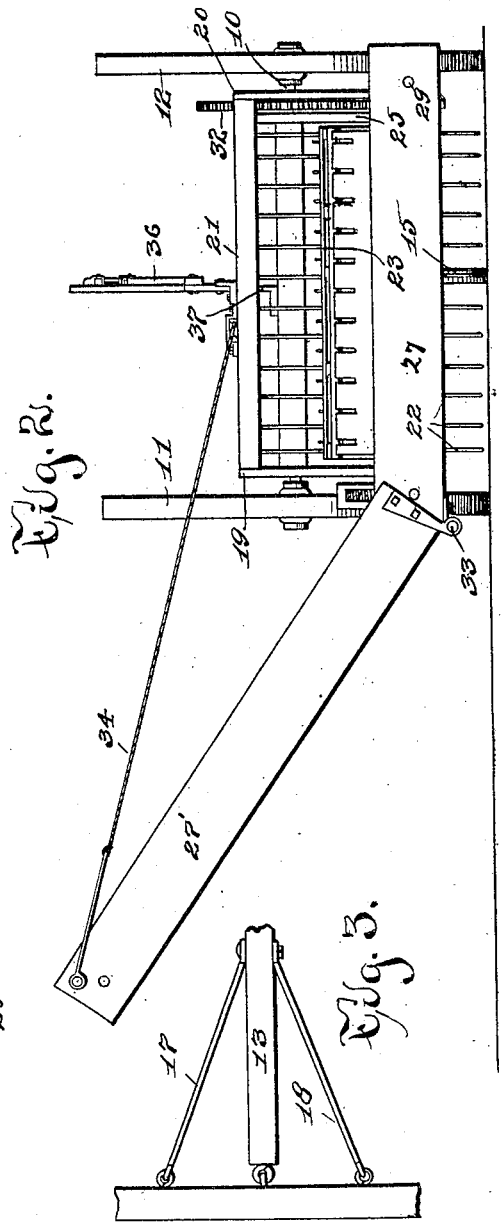

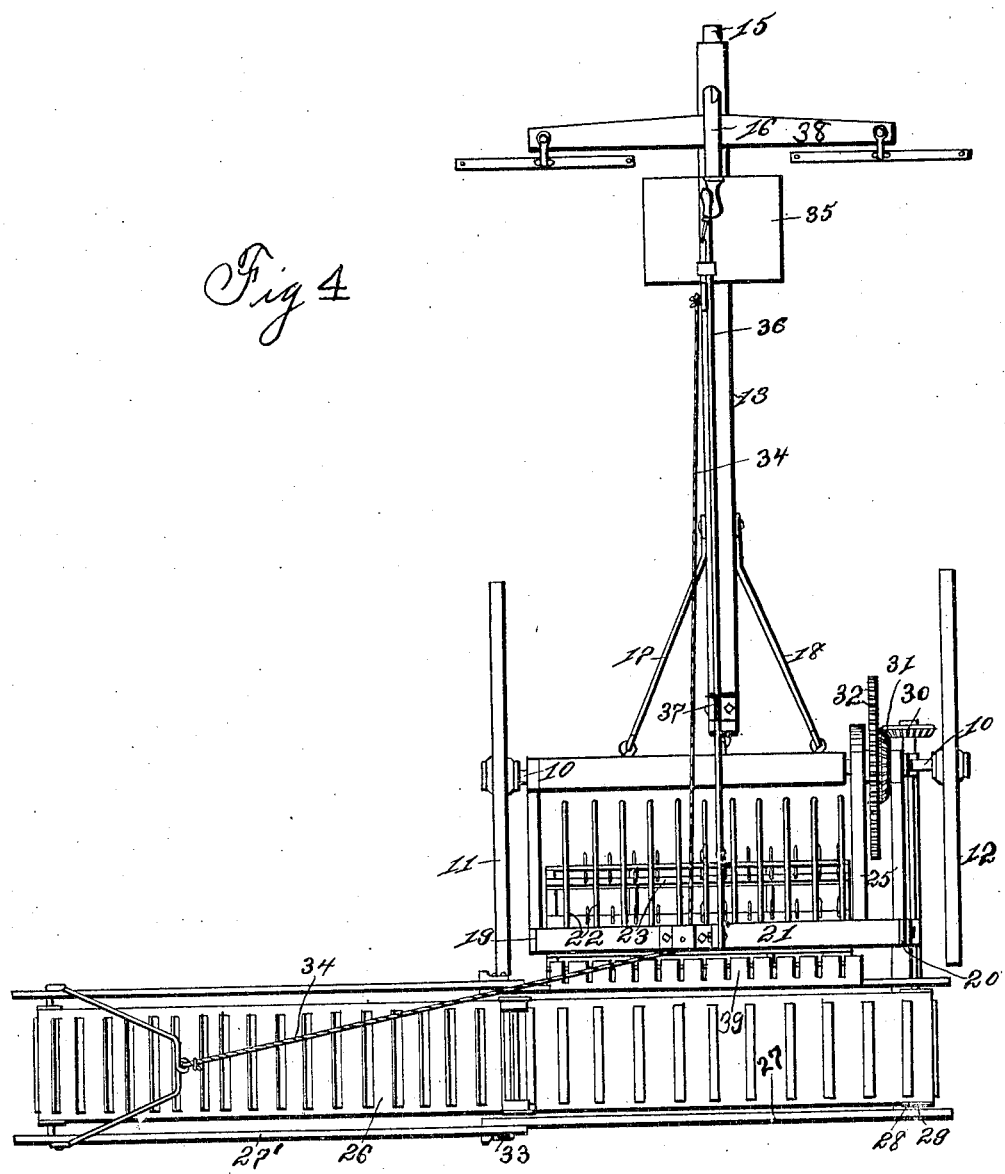

UNITED STATES PATENT OFFICE.

GEORGE A. CULVER, OF SHENANDOAH, IOWA.

HAY RAKE AND LOADER.

No. 851,499.

Specification of Letters Patent.

Patented April 23, 1907.

Application filed January 9, 1904. Serial No. 188,418.

*To all whom it may concern:*

Be it known that I, GEORGE A. CULVER, a citizen of the United States, residing in Shenandoah, county of Page, and State of Iowa, have invented a new and useful Improvement in a Hay Rake and Loader, of which the following is a specification.

The object of my invention is to provide a combination hay rake and loader, simple, strong, durable, and inexpensive in construction, adapted to pick up the hay from the ground in the condition in which it is left by the mower and to distribute it evenly upon a wagon-bed.

My invention consists of certain details of construction hereinafter set forth, pointed out in my claims and illustrated in the accompanying drawings; in which Figure 1 shows a side elevation view of my device, one of the wheels being removed; Fig. 2 shows a front elevation view of my device; and Fig. 3 shows a detail view of the manner in which I secure the pole to the axle. Fig. 4 is a plan view of my device, the teeth on the cylinder 23 not being shown to avoid confusion.

Referring to the accompanying drawings, reference numeral 10 is used to indicate the axle on which the forward wheels 11 and 12 are mounted, and the numeral 13 indicates the tongue, or pole, I employ being loosely secured centrally to the rear of the axle, said pole extending backwardly therefrom. At the extreme rear end of the pole 13, I have provided a rotating truck 14 mounted on a single wheel 15, said truck being designed to be rotated by means of a lever 16 as will be hereinafter described. Secured to each side and near the forward portion of the pole 13, is a hound 17 and 18 respectively, their other ends being loosely secured to the rear of the axle 10 for purposes hereinafter stated.

Rigidly secured to the axle 10, at points immediately inside the wheels 11 and 12, I have provided frame portions 19 and 20 respectively, said frame portions projecting forwardly and downwardly from the axle and being joined at their upper extremities by a cross bar 21, to which I have secured the teeth 22 of my rake, said teeth being semicircular in conformation. Mounted within the arc thus formed by the teeth 22 and having its bearings affixed to the forward uprights of the frame portions 19 and 20, is a spiked cylinder 23 provided on one end with a belt wheel 24 operated by a belt 25 driven by a second belt wheel 26ᵃ which is secured to the axle 10 and driven by the gearing which operates my device.

The numeral 26 indicates an endless apron moving on rollers in a chute 27, at right angles to the base of the frame portions 19 and 20, immediately in front of the wheels 11 and 12, said chute being provided with a hinged upper portion 27′ said apron being operated by means of a drive roller 28 secured to a shaft 29 having its bearings affixed to both the front and rear uprights of the frame portion 20, said shaft being provided on its outer end with a pinion 30 operated by a driven wheel 31 which, in turn is operated by a drive wheel 32 secured to the axle 10 and driven by the movement of the machine.

The numeral "33" indicates a hinge constituting the means of fastening the upper portion "27′" of the chute to the lower portion "27" and the numeral "34" indicates a cable, secured to the upper portion "27′" of the chute by means of a bail, extending to a seat "35" near the rear end of the pole "13" said cable being designed to be operated by the driver for purpose of lowering or raising the upper portion "27′" of the chute.

The numeral 36 indicates a lever loosely secured by means of a hinged fastening to the central portion of the cross bar 21, fulcrumed to an upright 37, rigidly secured to the top of the pole 13, said lever being designed to be operated by a person occupying the driver's seat 35. Immediately in front of the rear truck 14, I have provided the draft 38 for the horses which are designed to be faced toward the machine and thus obviously to push it along instead of pulling it.

39 designates a flange on the inner side of the lower or horizontal portion 27 of the chute, said flange being provided with slots for the passage of the spikes of the cylinder 23 so as to disengage the hay from the cylinder when the cylinder revolves and cause the hay to fall upon the apron 26.

In practical operation the machine moving forward and being steered by means of the driver moving the lever 16 which operates the single wheel 15 in the manner of a helm, the rake 22 picks up the hay from the ground and the spiked cylinder 23 carries it upwardly on the rake and then throws it into the chute 27 and onto the endless apron 26 which is moving upwardly driven by means of the gear wheel 32 secured to the axle 10 engaging the gear wheel 31 which, in turn, engages the pinion 30 secured to the shaft 29 which operates the roller 28.

The position relative to the ground of the rake and the entire frame portions including the chute, is determined and is adjustable by means of the driver operating the lever 36, the entire frame portions being designed to be moved upwardly or downwardly from the forward end of the pole 13 where it is loosely secured to the axle. I have provided loose mounting on the axle for the hounds 17 and 18 so that they will not retard or interfere with the adjusting as described.

Having thus described my invention, what I claim and desire to secure by Letters Patent of the United States is:

1. The combination with the axle and the rake arranged in front of the axle, of a platform arranged in front of the rake, a cylinder arranged above the points of the rake teeth and in the rear of the platform, and means for swinging the rake and the platform about the axle to simultaneously raise or lower the rake and the platform.

2. The combination with the axle, of a frame in which the axle turns, extending forwardly from the axle, a rake carried by the frame, a platform carried by the frame in front of the rake, a spiked cylinder arranged on the frame above the points of the rake teeth and in the rear of the platform, a pole, means connecting the pole and the frame and constructed to permit the frame to be turned on the axle to elevate the rake, the platform and the cylinder, but to prevent the pole swinging sidewise relatively to the axle, draft means for the horses carried by the pole, a truck at the rear end of the pole, means for controlling the truck, and means for elevating or lowering the rake, the platform and the cylinder.

3. The combination with the hay rake, of a platform arranged in front of the rake, a slotted or recessed plate on the platform, and a cylinder arranged between the rake and the slotted plate and having spikes extending obliquely in the direction opposite to the direction of rotation of the cylinder.

GEORGE A. CULVER.

Witnesses:
T. F. ROE,
FRANK STEINER.